United States Patent
Grannemann et al.

(10) Patent No.: US 9,545,828 B2
(45) Date of Patent: Jan. 17, 2017

(54) BALL AND SOCKET JOINT FOR A VEHICLE

(71) Applicant: ZF Friedrichshafen AG, Friedrichshafen (DE)

(72) Inventors: Bernd Grannemann, Espelkamp-Frotheim (DE); Martin Rechtien, Neuenkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 98 days.

(21) Appl. No.: 14/386,363

(22) PCT Filed: Mar. 19, 2013

(86) PCT No.: PCT/EP2013/055594
§ 371 (c)(1),
(2) Date: Sep. 19, 2014

(87) PCT Pub. No.: WO2013/156235
PCT Pub. Date: Oct. 24, 2013

(65) Prior Publication Data
US 2015/0098749 A1    Apr. 9, 2015

(30) Foreign Application Priority Data
Apr. 20, 2012   (DE) .................. 10 2012 206 537

(51) Int. Cl.
*B60G 7/00*   (2006.01)
*F16C 11/10*  (2006.01)
(Continued)

(52) U.S. Cl.
CPC .............. *B60G 7/005* (2013.01); *B60G 7/006* (2013.01); *F16C 11/0647* (2013.01);
(Continued)

(58) Field of Classification Search
CPC F16C 11/106; Y10T 403/32811; B60G 7/005; B60G 7/006; B60G 2204/416; B60G 2202/40; B60G 2204/14
See application file for complete search history.

(56) References Cited

U.S. PATENT DOCUMENTS 4,372,621 A     2/1983  Farrant
4,708,510 A  *  11/1987 McConnell ............ A61G 13/12
                                                      403/137
(Continued)

FOREIGN PATENT DOCUMENTS

DE   1 287 373        1/1969
DE   30 23 963 A1     1/1981
(Continued)

OTHER PUBLICATIONS

German Search Report Corresponding to 10 2012 206 537.7 mailed Oct. 31, 2013.
(Continued)

*Primary Examiner* — Jonathan Masinick
(74) *Attorney, Agent, or Firm* — Michael J. Bujold; Davis & Bujold, PLLC

(57) ABSTRACT

A ball joint for a vehicle, with a ball pin that has a joint ball, a joint housing that encloses the joint ball and is provided with a pin opening, in which the joint ball of the ball pin is fitted and able to move. The ball pin extends out of the joint housing through the pin opening. An actuator can press a pressure element, in an axial direction, against the joint housing in such a manner that pressure can be exerted by the joint housing and the pressure element onto the joint ball. The actuator acts upon a spring which acts upon the pressure element. The length of the spring can be measured by a displacement sensor.

11 Claims, 2 Drawing Sheets

(51) Int. Cl.
  *F16C 11/06* (2006.01)
  *G01L 1/04* (2006.01)
  *G01L 5/00* (2006.01)
(52) U.S. Cl.
  CPC .............. *F16C 11/106* (2013.01); *G01L 1/04* (2013.01); *G01L 5/0023* (2013.01); *B60G 2202/40* (2013.01); *B60G 2204/14* (2013.01); *B60G 2204/416* (2013.01); *Y10T 403/20* (2015.01)

(56) References Cited

U.S. PATENT DOCUMENTS

| | | | |
|---|---|---|---|
| 5,020,933 A | 6/1991 | Salvestro et al. | |
| 5,738,344 A | 4/1998 | Hagman | |
| 5,957,445 A * | 9/1999 | Hagman | B23Q 1/545 269/75 |
| 2002/0177857 A1* | 11/2002 | Otsuka | A61B 19/26 606/130 |
| 2004/0245732 A1* | 12/2004 | Kotulla | B60G 11/44 280/5.502 |
| 2007/0003360 A1 | 1/2007 | Ditzler | |
| 2008/0000291 A1* | 1/2008 | Masser | B82Y 35/00 73/105 |
| 2009/0232590 A1 | 9/2009 | Ersoy et al. | |
| 2011/0101192 A1* | 5/2011 | Lee | F16C 11/106 248/346.03 |
| 2013/0200248 A1* | 8/2013 | Polzer | G01R 33/022 248/550 |

FOREIGN PATENT DOCUMENTS

| | | | |
|---|---|---|---|
| DE | 195 21 060 A1 | 12/1996 | |
| DE | 197 12 947 A1 | 10/1997 | |
| DE | 102 45 983 A1 | 4/2004 | |
| DE | 699 14 648 T2 | 9/2004 | |
| DE | 10 2006 031 707 A1 | 1/2008 | |
| GB | 1 172 930 | 12/1969 | |
| JP | EP 0868885 A1 * | 10/1998 | ............. A61B 19/28 |
| WO | 2006/099821 A1 | 9/2006 | |

OTHER PUBLICATIONS

International Search Report Corresponding to PCT/EP2013/055594 mailed Jun. 7, 2013.
Written Opinion Corresponding to PCT/EP2013/055594 mailed Jun. 7, 2013.

* cited by examiner

BALL AND SOCKET JOINT FOR A VEHICLE

This application is a National Stage completion of PCT/EP2013/055594 filed Mar. 19, 2013, which claims priority from German patent application serial no. 10 2012 206 537.7 filed Apr. 20, 2012.

FIELD OF THE INVENTION

The invention concerns a ball joint for a vehicle, with a ball pin comprising a joint ball, a joint housing that encloses the joint ball and that is provided with a pin opening, in which housing the joint ball of the ball pin is fitted so that it can move, wherein the ball pin projects out of the joint housing through the pin opening, and an actuator which biases a pressure element in an axial direction onto the joint housing so that by virtue of the joint housing and the pressure element a pressure can be exerted on the joint ball.

BACKGROUND OF THE INVENTION

DE 102 45 983 A1 describes a ball joint with a housing, two bearing socket elements arranged in the housing, a joint body comprising a pin and a joint ball which fits between the two bearing socket elements, and a housing bottom positioned on the side of the pin facing away from the pin. Between a first of the two bearing socket elements and the housing bottom is arranged an adjustable clamping device by means of which the pre-stress with which the joint body is held between the bearing socket elements can be varied. To vary the mechanical pre-stress the clamping device can comprise piezoelectric or hydraulic elements, for example a hydraulic piston.

It is known that the frictional torque of a ball joint can be adjusted. Some systems for this make use of an adjustment drive which, to influence the frictional torque, exerts an axial force on the ball and its bearing. To determine the frictional torque a sensor system with an evaluation unit is required, which concludes what the frictional torque is on the basis of various measured parameters.

However, the frictional torque cannot be determined in every situation. Since it occurs only when the frictional elements move relative to one another, other parameters have to be found in order to determine or adjust it. These parameters can for example be the path to be covered by a pressure element, the counting of revolutions of a driving electric motor or the measurement of a motor current, which is brought into relationship with the frictional torque produced by means of an evaluation unit and a calculation. The primary aim of these options is to determine the axial force acting on the ball joint in order to be able to set the desired frictional torque. These derived parameters, however, are prone to large disturbing influences due to interfering forces from outside, wear in the ball joint, elastic effects and friction in the system, temperature dependencies and other influences which are difficult to allow for. Direct measurement of the force requires sensors which, although known from the field of measurement technology, are not accessible in the case of large production runs (such as in the automobile industry) for cost reasons.

SUMMARY OF THE INVENTION

Starting from there the purpose of the present invention is to provide an inexpensive possibility for determining the axial force.

This objective is achieved by a ball joint according to the description below.

The ball joint for a vehicle, in particular a motor vehicle, comprises a ball pin having a joint ball, a joint housing that surrounds the joint ball and is provided with a pin opening, in which housing the joint ball of the ball pin is fitted so that it can move, in particular rotate and/or swivel, wherein the ball pin extends out of the joint housing through the pin opening, an actuator by means of which a pressure element can be moved and in particular pressed in an axial direction onto the joint housing so that a pressure can be exerted by the joint housing and the pressure element on the joint ball, a spring by way of which the actuator acts upon the pressure element, and a displacement sensor by means of which the length of the spring can be measured.

From the length of the spring, using Hooke's law the spring force can be calculated if the spring constant of the spring is known. This spring force corresponds in particular to the axial force sought. Since suitable springs and displacement sensors are widely and inexpensively available on the market, the combination of a spring and displacement sensor forms an inexpensive force sensor.

Preferably, the spring is located in the force flow between the actuator and the joint ball and/or the pressure element. Then, in particular the spring force corresponds to the axial force exerted by the pressure element on the joint ball. By way of the spring, the actuator preferably acts axially on the pressure element and/or on the joint ball. In particular, the ball pin extends through the pin opening outward from the joint housing in the axial direction.

Preferably, the spring constant of the spring is known. Furthermore, it is also preferable for a reference length of the spring and a reference force that acts at the reference length to be known. For example, as its reference length the length of the unloaded spring is known. In particular, by means of the displacement sensor the absolute length of the spring can be measured.

The length of the spring is in particular its length in the spring direction. Advantageously, with increasing spring force and/or axial force the length of the spring becomes smaller. In particular, the spring is a compression spring. Preferably, the spring direction coincides with the axial direction.

In a further development an evaluation unit coupled with the displacement sensor is provided, by means of which the force exerted by the pressure element and/or the force acting on the joint ball, preferably the axial force, can be determined. The evaluation unit can be provided in or on the joint housing or it can be a distance away therefrom. In particular, the evaluation unit is connected to the displacement sensor by electric leads. For example, the evaluation unit comprises a digital computer, in particular a micro-controller. As a supplement or alternatively, however, the evaluation unit may comprise an analog computer.

In a design version the displacement sensor comprises an emitter element and a sensor element, by means of which at least one signal emitted or that can be emitted by the emitter element can be detected, which signal in particular provides information about the length of the spring. Advantageously, the signal strength and/or some other property of the signal at the location of the sensor element depends on the distance between the emitter element and the sensor element. For example, the emitter element and the sensor element are attached to the spring and in the spring direction are a distance apart. Preferably, one of these elements is connected to an end or connection point of the spring which is coupled to the pressure element. Furthermore, another of the elements is preferably connected to an end or connection point of the spring which is coupled to the actuator. Thus, the distance between the emitter element and the sensor element depends on the length of the spring. The evaluation unit is preferably connected to the sensor element, preferably by means of the electric leads.

In a further development the emitter element comprises a magnet, preferably a permanent magnet, whereas the sensor element comprises a sensor that is sensitive to magnetic field, in particular a sensor through which the magnetic field from the magnet passes. The signal preferably consists of the magnetic field and/or a parameter that characterizes the magnetic field, such as the flux density and/or the field strength of the magnetic field. In particular, the magnetic field at the location of the sensor element depends on the distance between the magnet and the sensor. For example, the flux density and/or the field strength of the magnetic field at the location of the sensor element depend on the distance between the magnet and the sensor. Thus, the length of the spring can be determined by way of a magnetic field measurement.

The actuator is preferably coupled with the pressure element with the spring interposed between them. Advantageously, the spring is one with low hysteresis and low temperature-dependence of its spring properties. The spring, for example, is a spiral spring, a cup spring, a leaf spring, a membrane spring or some other spring of known type. The spring is preferably made of metal.

The spring is preferably directed axially and/or preferably extends in the axial direction. Preferably, the force flow through the spring is directed axially. Thus, the length of the spring is described in particular by its axial extension. Preferably, the length of the spring is its axial length.

According to a further development, n the joint housing there is arranged a ball socket that encloses the joint ball, in which the ball is fitted so that it can move, in particular rotate and/or swivel. Preferably, the ball socket is arranged in the axial direction between the pressure element and an abutment on the housing.

The ball socket can be a multi-component, preferably two-component ball socket. In one design the ball socket has two ball socket components, a first of these ball socket components is supported axially against the pressure element or is formed by it. In particular, the first ball socket component can be pressed by the actuator against the joint ball and/or can be moved relative to and/or in the joint housing, particularly in the axial direction. A second one of the ball socket components is preferably supported axially on the joint housing and/or solidly connected therewith and/or formed by it. In particular, the second ball socket component is supported axially against the a housing abutment or against the housing abutment. The ball socket components are in particular separate components.

In one design the ball socket components are arranged opposite one another in the axial direction. In particular, the joint ball is arranged and/or enclosed between the ball socket components in the axial direction.

In a preferred alternative the ball socket is a one-piece ball socket provided with at least one slot, for example in the area of its pin opening. In particular, the slot extends in the axial direction and is advantageously open to the pin opening. By virtue of the slot the insertion of the joint ball into the one-piece ball socket through the pin opening can be facilitated. If, as described above, a pressure is exerted on the ball socket in order to increase the frictional torque, then the slots in the axial direction give the advantage that space is made available for the elastic deformation of the ball socket.

The ball socket and/or the ball socket components are preferably connected rotationally fixed with the joint housing relative to the axial direction. The ball socket preferably has an additional pin opening, through which the ball pin extends out of the ball socket in particular in the axial direction. Preferably, the joint housing is made of metal, in particular steel.

The ball socket is preferably provided with a hollow-spherical bearing surface. In particular, the ball surface of the joint ball rests against and can slide on the hollow-spherical bearing surface. Preferably, the mid-points of the hollow-spherical bearing surface and of the joint ball coincide. The ball socket is preferably made of plastic, in particular polyacetal (POM). In the case of the multi-component or two-component ball socket, each of the ball socket components preferably comprises one part of the hollow-spherical bearing surface. In particular, at least the first ball socket component is made of plastic. Advantageously, both ball socket components are made of plastic. In particular, the plastic can be reinforced with metallic or plastic fibers.

Preferably, the ball socket can be compressed in the axial direction by means of the actuator, in particular with the pressure element interposed. If the pressure element is pressed and/or moved in the axial direction onto the first ball socket component, the ball socket is compressed particularly in the axial direction. In the case of a multi-component or two-component ball socket, in particular the ball socket components move toward one another. In the case of a one-piece ball socket the ball socket can be deformed in the axial direction, preferably elastically. Preferably, the ball socket can be compressed by means of the actuator in the axial direction with deformation of the ball socket.

Preferably, the pressure component is in contact with the ball socket and/or the first ball socket component. The purpose of the pressure element is preferably to transmit the spring force uniformly to the ball socket and/or the first ball socket component and/or to retain the spring on the ball socket and/or the first ball socket component. In particular, the end of the spring coupled to the pressure element is in contact with the pressure element. Preferably, the emitter element of the displacement sensor is fixed on the pressure element.

According to one design, at its outer area facing toward the pressure element the ball socket is of conical shape. Preferably, the pressure element has a conical recess into which the conical outer area of the ball socket facing toward the pressure element fits. In a further development, at its outer area facing toward the abutment of the housing the ball socket is of conical shape. Preferably, the housing abutment has a conical recess into which the conical outer area of the ball socket facing toward the housing abutment fits. This conical design makes for particularly effective force transfer to the ball socket.

The ball pin preferably has a pin portion which is connected firmly, in particular solidly to the joint ball. For example, the pin portion is formed integrally and/or material-homogeneously with the joint ball. Alternatively the joint ball and the pin portion are made as separate components which are then joined together. The ball pin is preferably made of metal, in particular steel. Advantageously, the ball pin with its joint ball is fitted in a ball socket so that it can slide. In particular, the ball pin extends with its pin portion out of the ball socket and/or out of the joint housing.

The spring is in particular fitted between the actuator and the pressure element, and the stiffness (spring constant) of the spring is known. Although the spring is in a closed force flow with other, mostly unknown elasticities (such as that of the joint housing, the ball socket and the actuator), it can still be assumed that the spring force is equal to the axial force sought, namely that which acts upon the assembly consisting of the ball socket and the joint ball, since the elasticities are connected in series. Thus, measurement of the absolute length of the spring with its known spring constant enables the evaluation unit to compute the force that is acting. Since the sensor element and the emitter element of the displacement sensor are preferably coupled to the two connection points of the spring, the force determination is in particular also independent of any clearance that may be produced due to wear. Such a clearance is recognized for example as a reduction of the spring force and can be followed through by the actuator.

The joint housing preferably comprises an opening opposite the pin opening. Through this opening all the above-mentioned components, beginning with the ball pin and ball socket, can be inserted into the housing. The housing is then closed by suitable closure means. Suitable for that purpose are a cover or closing rings rolled together with the end of the housing. Alternatively, the housing can have at its end a thread so that the housing can be closed with a housing cover having a corresponding matching thread. The version with a thread thus enables the joint housing to be opened non-destructively in order to maintain or replace the ball joint or individual components thereof.

BRIEF DESCRIPTION OF THE DRAWINGS

Below, the invention is described with reference to preferred example embodiments illustrated in the drawing, which shows.

DETAILED DESCRIPTION OF THE PREFERRED EMBODIMENTS

Figure 1:
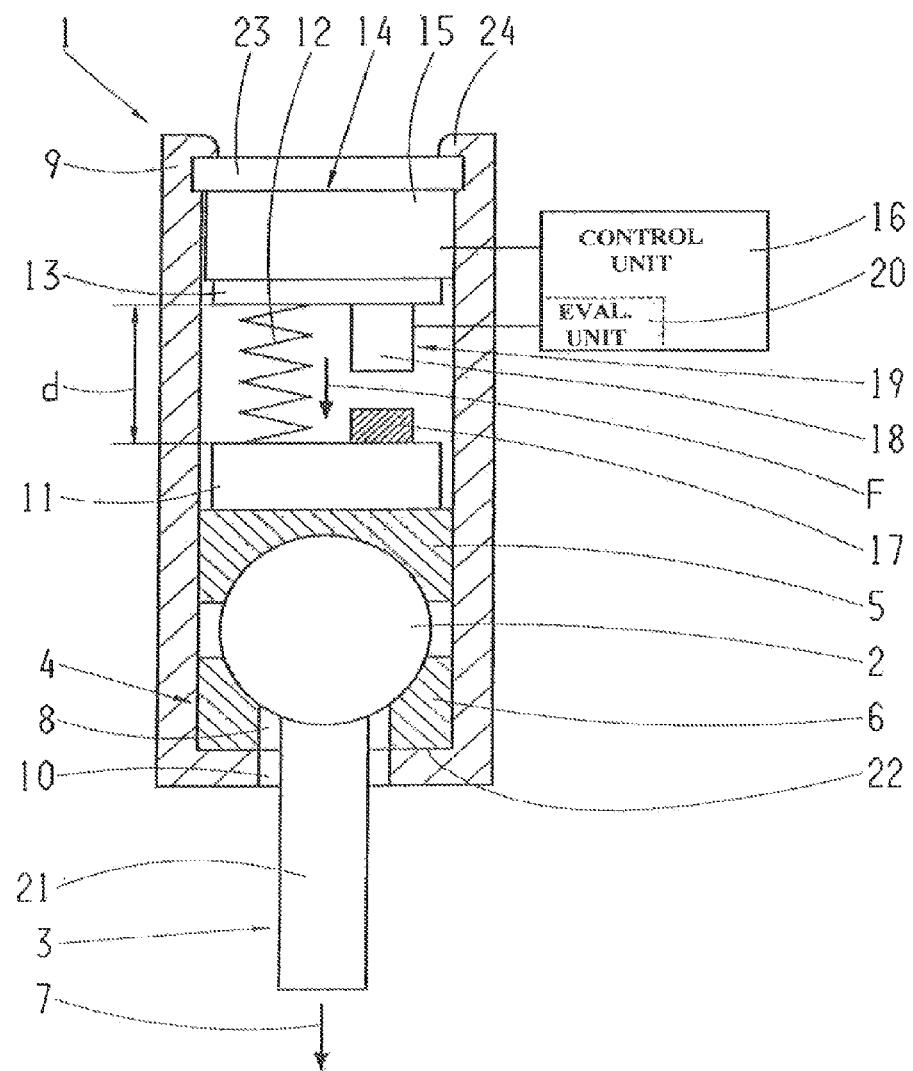
FIG. 1: A schematic longitudinal section through a first embodiment of a ball joint.

FIG. 1 shows a schematic longitudinal section through a first embodiment of a ball joint 1, wherein a ball pin 3 is fitted with its joint ball 2 able to rotate and/or swivel within a ball socket 4. The ball socket 4 comprises a first ball socket component 5 and a second ball socket component 6, the ball socket components 5 and 6 being in contact on different sides in an axial direction 7 with the joint ball 2. Furthermore, the second ball socket component 6 has a pin opening 8 through which the ball pin 3 extends axially out of the ball socket 4. In this first embodiment the ball socket 4 is made in two parts so that the ball socket components 5 and 6 are separate components. The ball socket 4 is arranged together with the joint ball 2 in a joint housing 9, which is also provided with a pin opening 10 through which the ball pin 3 extends out of the housing 9. The ball pin 3 has a pin portion 21 connected solidly to the joint ball 2.

The first ball socket component 5 can be displaced in the axial direction 7 within the housing 9, whereas in contrast the second ball socket component 6 rests in the axial direction 7 against an abutment 22 of the housing 9. On a side of the first ball socket component 5 facing away from the joint ball 2 is attached a pressure element 11 which, with interposition of a spring 12, is coupled to a moving part 13 of an actuator 14. A static part 15 of the actuator 14 is fixed to the housing 9. The actuator 14 is connected to a control unit 16 by which it can be controlled. In particular the moving part 13 of the actuator 14 can be moved by means of the control unit 16 in the axial direction 7 relative to the static part 15, in such manner that the distance d between the moving part 13 and the pressure element 11 can be varied. A change of the distance d, however, also results in a change of the force F exerted in the axial direction 7 by the actuator 14 with the spring 12 interposed upon the pressure element 11. The pressure element 11 passes on the force F to the first ball socket component 5, which therefore presses the joint ball 2 in the axial direction 7 against the second ball socket component 6. Since the actual distance d corresponds to the actual length of the spring 12 and this is arranged in the force flow between the actuator 14 and the ball socket component 5, from the length d and the spring constant of the spring 12, the force F can be calculated using Hooke's law. For this, in particular the spring constant is assumed to be known.

On a side of the pressure element 11 facing toward the moving part 13 an emitter element 17 is fixed, which is opposite a sensor element 18 attached to a side of the moving part 13 facing toward the pressure element 11 and which is an axial distance away from the emitter element 17. For example the emitter element 17 is a permanent magnet and the sensor element 18 is in the form of a sensor sensitive to magnetic fields, through which the magnetic field of the permanent magnet passes. A change of the distance between the pressure element 11 and the moving part 13 thus results in a change of the magnetic field at the location of the sensor, which can be detected by the sensor. The emitter element 17 and the sensor element 18 together therefore form a displacement sensor 19 by means of which the distance d can be determined.

The sensor element 18 is connected to an evaluation unit 20 and provides this information about the distance d, so that by means of the evaluation unit 20, the force F exerted by the spring 12 on the pressure element 11 can be calculated. For this purpose the spring constant of the spring 12 is stored as a datum. Furthermore, preferably the length of the unloaded spring 12 is also stored in the evaluation unit 20 as a datum. In the embodiment shown, the evaluation unit 20 is composed of zfthe control unit 16.

At its end remote from the pin opening 10, the housing 9 is closed by a cover 23 which is held in place by an appropriately shaped housing rim 24.

Figure 2:
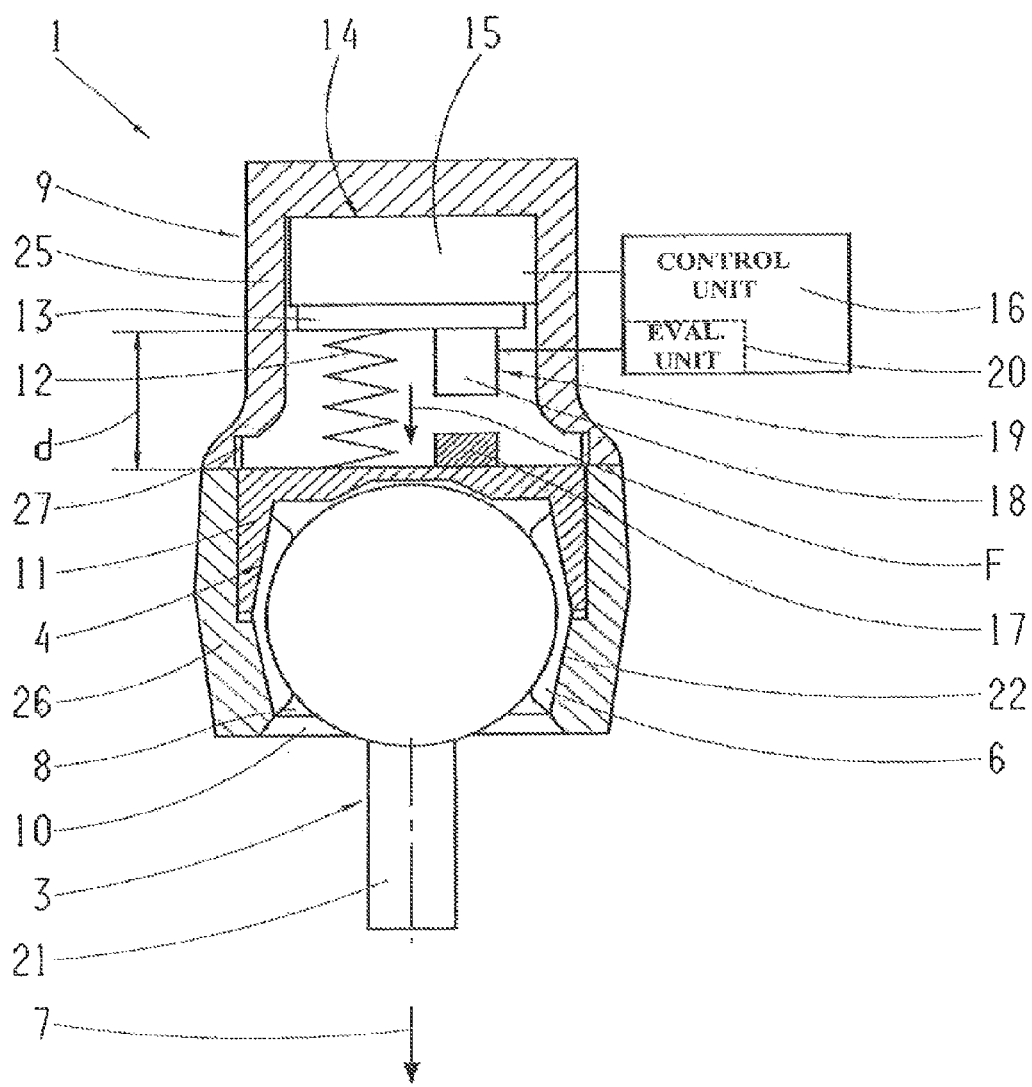
FIG. 2: A schematic longitudinal section through a second embodiment of a ball joint.

FIG. 2 shows a schematic longitudinal section through a second embodiment of a ball joint 1. In the figure, features similar or identical to those in the first embodiment are indexed the same way as in the first embodiment. Otherwise than in the first embodiment, the ball socket 4 is made in one piece and is arranged in the axial direction 7 between the pressure element 11 and the housing abutment 22. Thus, the ball socket 4 is in contact with both the pressure element 11 and the abutment 22. If now the moving part 13 of the actuator 14 is displaced in the axial direction 7 relative to the static part 15, in such manner that the axial distance d between the moving part 13 and the pressure element 11 changes, which results in a change of the force F exerted in the axial direction 7 by the actuator 14 with the spring 12 interposed upon the production element 11, the pressure element 11 transmits the force F to the ball socket 4 which is thereby compressed axially so that the pressure exerted on the joint ball 2 increases.

The pressure element 11 is provided with a conical recess into which the ball socket 4 fits with a first conical outer surface. Moreover, the abutment 22 is also provided with a conical recess into which the ball socket 4 fits with a second conical outer surface axially opposite the first conical outer surface. The housing 9 too is made in two parts, with a first housing part 25 and a second housing part 26 that is screwed into the first housing part 25 by means of a thread 27.

Apart from that difference the second embodiment is substantially the same as the first embodiment, so that for a more detailed description of the second embodiment reference should be made to the description of the first embodiment.

INDEXES

1 Ball joint
2 Joint ball
3 Ball pin
4 Ball socket
5 First ball socket component
6 Second ball socket component
7 Axial direction
8 Pin opening in the ball socket
9 Joint housing
10 Pin opening in the joint housing
11 Pressure element
12 Spring
13 Moving part of the actuator
14 Actuator
15 Static part on the actuator
16 Control unit
17 Emitter element
18 Sensor element
19 Displacement sensor
20 Evaluation unit
21 Pin portion of the ball pin
22 Axial housing abutment
23 Cover
24 Rim of the housing
25 First housing component
26 Second housing component
27 Thread
d Distance/spring length
F Spring force/axial force

The invention claimed is:

1. A ball joint, for a vehicle, with a ball pin (3) comprising:
  a joint ball (2),
  a joint housing (9) enclosing the joint ball (2) and being provided with a pin opening (10) in which the joint ball (2), of the ball pin (3), is fitted and movable, the joint housing defines an axis,
  the ball pin (3) extending out of the joint housing (9) through the pin opening (10),
  an actuator (14) having a static part and a moving part, the static part is axially fixed with respect to the joint housing and the moving part is connected to the static part, the moving part is axially movable with respect to the static part such that movement of the moving part away from the static part presses a pressure element (11) in an axial direction (7) against the joint housing (9) such that pressure is exerted by the joint housing (9) and the pressure element (11) onto the joint ball (2),
  the actuator comprising a spring (12) that extends axially and by way of which the actuator (14) acts upon the pressure element (11), and
  a displacement sensor (19) comprising a sensor element and an emitter element for measuring an axial length (d) of the spring (12), a first axial end of the spring and one of the sensor and the emitter elements abut a common surface of the moving part of the actuator, and a second axial end of the spring and the other of the sensor and the emitter elements abut a common surface of the pressure element.

2. The ball joint according to claim 1, wherein the ball joint comprises an evaluation unit (20) which is connected to the sensor element of the displacement sensor (19), by which a force (F), exerted by the pressure element (11) on the joint ball (2), is determinable.

3. The ball joint according to claim 1, wherein the emitter element (17) and the sensor element (18) are aligned with each other along the axis, at least one signal emitted by the emitter element (17), is detectable by the sensor element and the signal provides information about an axial distance between the moving part of the actuator and the pressure element as well as the length (d) of the spring (12).

4. The ball joint according to claim 3, wherein the emitter element is connected to the second end of the spring (12) that is coupled to the pressure element (11) and the sensor element is connected to the first end of the spring (12) that is coupled to the actuator (14) so that a distance, between the sensor element and the emitter element (17, 18), depends upon the axial length (d) of the spring (12).

5. The ball joint according to claim 3, wherein the emitter element (17) comprises a permanent magnet and the sensor element (18) comprises a sensor that is sensitive to a magnetic field, and a magnetic field from the permanent magnet is arranged to pass through the sensor.

6. The ball joint according to claim 1, wherein the spring (12) is selected from a group of springs consisting of a spiral spring, a cup spring, a leaf spring and a membrane spring.

7. The ball joint according to claim 1, wherein the moving part of the actuator (14) is axially movable relative to the static part of the actuator and is coupled to the pressure element (11) and the spring (12) is interposed therebetween.

8. The ball joint according to claim 1, wherein the ball joint comprises a ball socket (4) that is arranged in the joint housing (9) and surrounds the joint ball (2), the joint ball (2) is fitted and movable in the ball socket, and the ball socket (4) is arranged in the axial direction (7) between the pressure element (11) and an abutment (22) of the joint housing.

9. The ball joint according to claim 8, wherein the ball socket (4) comprises two ball socket components (5, 6), a first of the ball socket components (5) is axially in contact with another surface of the pressure element (11) opposite the common surface thereof and a second of the ball socket components is axially in contact with the abutment (22), and the joint ball (2) is arranged, in the axial direction (7), between the first and the second ball socket components (5, 6).

10. The ball joint according to claim 8, wherein the ball socket (4) is made integrally and is compressible in the axial direction (7) by the actuator (14).

11. A ball joint for a vehicle, the ball joint comprising:
  a ball pin comprising a joint ball;
  a joint housing enclosing the joint ball such that the joint ball being movably fitted within the joint housing, and the joint housing comprises a pin opening through which the ball pin extends in an axial direction out of the joint housing;
  an actuator comprises a static part and a moving part, one axially facing surface of the static part abuts an axial end of the joint housing such that the static part of the actuator is axially fixed relative to the joint housing, the moving part abuts an opposite axially facing surface of the static part, a control unit is connected the actuator and axially moves the moving part relative to the static part an axial surface of the moving part that is axially opposite the static part contacts one axial end of a spring, an opposite axial end of the spring abuts, in the axial direction, against a pressure element and the pressure element contacts the joint ball, the moving part being axially movable to axially bias the spring and the pressure element to apply pressure on the joint ball; and a displacement sensor being fixed to the axial surface of the moving par that is axially opposite the static part, and the displacement sensor measures a separation distance between the moving part of the actuator and the pressure element and thereby a length of the spring.

\* \* \* \* \*